(12) United States Patent
Amthor et al.

(10) Patent No.: US 12,339,435 B2
(45) Date of Patent: Jun. 24, 2025

(54) MICROSCOPY SYSTEM AND METHOD FOR MONITORING MICROSCOPE ACTIVITY

(71) Applicant: Carl Zeiss Microscopy GmbH, Jena (DE)

(72) Inventors: Manuel Amthor, Jena (DE); Daniel Haase, Zoellnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 526 days.

(21) Appl. No.: 17/824,189

(22) Filed: May 25, 2022

(65) Prior Publication Data

US 2022/0382035 A1   Dec. 1, 2022

(30) Foreign Application Priority Data

May 31, 2021   (DE) ..................... 10 2021 114 038.2

(51) Int. Cl.
*G02B 21/26* (2006.01)
*G02B 21/34* (2006.01)
*G02B 21/36* (2006.01)
*G06N 3/067* (2006.01)

(52) U.S. Cl.
CPC ............. *G02B 21/26* (2013.01); *G02B 21/34* (2013.01); *G02B 21/362* (2013.01); *G06N 3/0675* (2013.01)

(58) Field of Classification Search
USPC ........................................................ 348/79
See application file for complete search history.

(56) References Cited

U.S. PATENT DOCUMENTS

| | | | | |
|---|---|---|---|---|
| 10,292,369 | B1* | 5/2019 | Heath | A61B 5/0205 |
| 10,797,987 | B1* | 10/2020 | Beacham | H04L 41/22 |
| 11,112,418 | B1* | 9/2021 | Holmes | G01N 15/1434 |
| 11,355,307 | B1* | 6/2022 | Kamenec | H01J 37/18 |
| 2003/0110844 | A1* | 6/2003 | Struckmeier | G01Q 10/065 73/105 |
| 2004/0109571 | A1* | 6/2004 | Yoshimine | A61B 5/00 381/67 |
| 2011/0311069 | A1* | 12/2011 | Ambrose | H04R 1/1041 381/71.6 |
| 2012/0120222 | A1* | 5/2012 | Lettow | G02B 21/24 359/368 |

(Continued)

FOREIGN PATENT DOCUMENTS

| | | |
|---|---|---|
| DE | 102007014771 A1 | 3/2008 |
| DE | 102017109698 A1 | 11/2018 |

(Continued)

OTHER PUBLICATIONS

Search Report for DE102021114038.2, Nov. 1, 2021, 7 pages (No English translation available).

*Primary Examiner* — Nigar Chowdhury
(74) *Attorney, Agent, or Firm* — LaBatt, LLC

(57) ABSTRACT

A microscopy system comprises a microscope for analyzing a sample, a computing device for processing measurement signals and at least one microphone for capturing sounds. The computing device is configured to evaluate captured sounds in order to identify a microscope activity in progress or command an intervention in the microscope activity in progress or identify ambient sounds based on microscope sounds.

22 Claims, 6 Drawing Sheets

(56) References Cited

U.S. PATENT DOCUMENTS

| | | | |
|---|---|---|---|
| 2014/0313312 A1* | 10/2014 | Gaiduk | H04N 23/663 |
| | | | 348/79 |
| 2017/0325011 A1* | 11/2017 | Kuki | B32B 27/281 |
| 2018/0071047 A1* | 3/2018 | Suzuki | A61B 34/20 |
| 2018/0242985 A1 | 8/2018 | Vipperman et al. | |
| 2019/0148191 A1* | 5/2019 | Wang | B24B 49/10 |
| | | | 438/10 |
| 2019/0174207 A1* | 6/2019 | Cella | H04L 67/12 |
| 2019/0369014 A1* | 12/2019 | White | G01N 21/3563 |
| 2020/0057291 A1 | 2/2020 | Haase et al. | |
| 2020/0088984 A1 | 3/2020 | Haase et al. | |
| 2020/0251302 A1* | 8/2020 | Nemoto | H01J 37/28 |
| 2020/0372635 A1* | 11/2020 | Veidman | G06T 7/0012 |
| 2020/0379236 A1 | 12/2020 | Amthor et al. | |
| 2021/0041679 A1* | 2/2021 | Yong | G02B 21/362 |
| 2021/0248746 A1* | 8/2021 | Naumenko | G02B 21/0024 |
| 2021/0302708 A1 | 9/2021 | Albrecht et al. | |
| 2021/0310796 A1* | 10/2021 | Gregory | G01B 17/00 |
| 2022/0057617 A1 | 2/2022 | Ohrt et al. | |

FOREIGN PATENT DOCUMENTS

| | | |
|---|---|---|
| DE | 102017111718 A1 | 12/2018 |
| DE | 102019114117 B3 | 8/2020 |
| DE | 102019008989 B3 | 6/2021 |
| DE | 102020108796 A1 | 9/2021 |
| DE | 102020210595 A1 | 2/2022 |
| EP | 2793069 A1 | 10/2014 |
| JP | 2002062485 A | 2/2002 |
| JP | 2018072272 A | 5/2018 |
| WO | 2020207648 A1 | 10/2020 |

\* cited by examiner

MICROSCOPY SYSTEM AND METHOD FOR MONITORING MICROSCOPE ACTIVITY

REFERENCE TO RELATED APPLICATIONS

The current application claims the benefit of German Patent Application No. 10 2021 114 038.2, filed on 31 May 2021, which is hereby incorporated by reference.

FIELD OF THE DISCLOSURE

The present disclosure relates to a microscopy system and a method for monitoring microscope activity.

BACKGROUND OF THE DISCLOSURE

The automatic monitoring of microscope components is playing an increasingly important role in modern microscopy systems. Microscopy systems are designed, for example, to be able to monitor a sample stage position or the presence of a DIC slider (DIC: differential interference contrast) or of certain objectives at an objective revolver. Enhanced safety is possible when a collision between, e.g., an objective of the microscope and a sample or sample carrier can be prevented or at least detected early. If a plurality of steps are executed successively in a workflow, especially automatically, it is desirable to be able to monitor the implementation of the steps and, where necessary, perform a corrective intervention. An automatic monitoring can also increase user friendliness, for example by automatically initiating a calibration mode when a user places a calibration sample on a sample stage of the microscope.

Monitoring systems of this type are described, inter alia, in DE 10 2017 111 718 A1, DE 10 2017 109 698 A1, DE 10 2019 114 117 B3 and DE 10 2020 210 595.2. Monitoring occurs here primarily by means of a camera, in particular an overview camera, which is provided in addition to a sample camera of the microscope. Any monitoring possible is limited to the field of view of the camera, whereby it is often only possible to monitor the area close to the sample. Adequate lighting conditions are also required so that an active illumination is potentially necessary.

In addition to an overview camera, an electrical component monitoring can also be implemented, for example by means of the "Automatic Component Recognition" technology (ACR) of the Applicant with which the components to be monitored are electrically contactable in order to transmit, inter alia, identification signals. It is also possible to identify appropriately designed microscope components by means of RFID. However, these approaches require specially designed components, which involves higher costs and potential compatibility issues. The risk of malfunction is also potentially higher, for example when a circuit board with electronic components is required. In some cases, a retrofitting is also costly or hardly feasible.

In principle, a monitoring can also occur by means of motion sensors, e.g., for detecting vibrations or collisions. However, this type of monitoring is limited to a relatively small number of monitorable properties. There is thus an ongoing need to provide options for monitoring activity or components on a microscope.

SUMMARY OF THE DISCLOSURE

It can be considered an object of the invention to provide a microscopy system and a method with which activity at a microscope can be monitored particularly precisely and with simple means in order to determine a measurement situation with accuracy or facilitate, where appropriate, a necessary intervention.

This object is achieved by means of a microscopy system with a microscope for analyzing a sample, a computing device for processing measurement signals, and at least one microphone for capturing sounds and by means of a method including evaluating captured sounds in order to identify a microscope activity in progress or command an intervention in the microscope activity in progress based on microscope sounds.

An embodiment of a microscopy system according to the invention comprises a microscope for analyzing a sample, a computing device for processing measurement signals and at least one microphone for capturing sounds. The computing device is configured to evaluate captured sounds in order to identify a microscope activity in progress based on microscope sounds or command an intervention in the microscope activity in progress.

In a method for monitoring microscope activity according to the invention, a microscope is operated, sounds are captured by at least one microphone, and the captured sounds are evaluated in order to identify a microscope activity in progress or command an intervention in the microscope activity in progress based on microscope sounds.

Microscope sounds can in particular be sounds generated by or on microscope components, e.g., sounds of a microscope component in operation, sounds caused by a movement of a microscope component, or sounds caused by a user on or with a microscope component. These kinds of microscope sounds are characteristic of an activity currently in progress and thus permit an inference as to which microscope component is being used, a property of the microscope component or a property of the activity currently in progress involving the microscope component.

A retrofitting of conventional microscopy systems is relatively easy to carry out via the addition of at least one microphone and the adaptation of a computing device (in particular its software) to evaluate captured sounds. In contrast to the electrical component recognition (ACR) mentioned above, it is possible to determine specific activities in progress while compatibility problems are essentially circumvented. Compared to known camera-based monitoring systems, the acoustic monitoring of the invention can allow activities or states to be determined that are difficult or impossible to capture visually: for example, sounds of a collision between microscope components can often be determined when it is still not clear by means of a camera monitoring whether there is still a small gap or already contact between two components. An activity status or defect can potentially be inferred from sounds of a microscope component in operation, e.g. a scanner, while a camera can merely see the housing of the microscope component.

Using captured sounds (audio signals), a microscope activity that is currently in progress can be identified and/or an intervention in the microscope activity in progress commanded. For example, a microscope activity "objective collision" can be identified from sounds of a collision between an objective and a cover slip and an intervention commanded based on this identification, for example the intervention "stop component movement". Alternatively, it is also possible for the evaluation of captured sounds, for example of the collision sounds, to result directly in the commanding of an intervention, for example "stop component movement", without the microscope activity "objective collision" being explicitly labelled or output beforehand.

A further embodiment of a microscopy system according to the invention comprises a microscope for analyzing a sample, a computing device for processing measurement signals and at least one microphone for capturing sounds. The computing device is configured to evaluate captured sounds in order to identify ambient sounds.

Optional Embodiments

Variants of the microscopy systems according to the invention and of the method according to the invention are the object of the dependent claims and are explained in the following description.

Detection of a Defect, an Operating State or a Collision

The computing device can be configured to infer a defect of a microscope component or that a microscope activity is not proceeding correctly, based on the microscope sounds. A microscope component can be, for example, a sample stage, an objective revolver, a screw-on or otherwise releasably attachable component, a laser scanner or an immersion device. Microscope sounds in these cases can be unusual sounds of a moving sample stage, unusual sounds during the changing of objectives, unusual frequencies during a scan of the laser scanner or a scanning mirror, a rattling of a screw-on or releasably attachable component or pumping sounds of an immersion unit, which are an indication of bubbles or air in the pumped medium.

Additionally or alternatively, the computing device can be configured to infer an operating state of the microscope based on the microscope sounds, in particular an operating state of a microscope component or interchangeable component of the microscope. For example, the computing device can be designed to detect one or more of the following as an operating state:
  a differential interference contrast mode, based on the sound of a DIC slider clicking into place as the microscope sound;
  a mounting of an objective, based on the sound of an objective being screwed into an objective revolver as the microscope sound;
  a sample stage movement, based on the sound of an operation of a (in particular manually operated) sample stage as the microscope sound;
  a defective support of a microscope component, based on microscope sounds characteristic of a loose support of the microscope component. For example, worn connections can give rise to a rattling, or an operation sound that occurs during normal operation can be different;
  an incorrect condenser position, based on movement sounds of a swivel arm of a condenser when no sound of a complete pivoting of the swivel arm into place is detected.

A condenser can be removed from the light path of the microscope by means of a swivel arm in order to, e.g., improve the accessibility of the sample area. This can be desirable in order to position a sample carrier. The condenser must subsequently be swivelled back into the light path by means of the swivel arm. If sounds of a swivel movement are captured but the sounds that typically occur in the event of a complete swivel movement into the light path are not detected, then the swivel arm has most likely not been properly moved all the way back. It is thus possible to detect such an incorrect position of the condenser acoustically.

Additionally or alternatively, the computing device can also be configured to detect one or more of the following as microscope sounds and corresponding identified microscope activities:
  cleaning sounds of a slide cleaning activity; for example, a wiping of a slide and/or breathing on a slide by a user, or rinsing sounds of an automated cleaning activity in which, e.g., an immersion medium is rinsed off.
  sounds of an application of an immersion medium; it is optionally possible to distinguish based on these sounds between a correct immersion activity and an incorrect immersion activity in which air bubbles get into the immersion medium. An incorrect immersion activity can be caused, for example, by a defective tube or by an essentially empty tank and identified by means of sounds that differ from a normal immersion activity.
  insertion sounds of a sample carrier insertion activity on a sample stage; it is optionally possible to distinguish based on the insertion sounds at least between an insertion of a glass slide, a plastic Petri dish and a microtiter plate, or in any event between different materials of the sample carrier.
  movement sounds of a filter wheel with filters being rotated in or out of a microscope light path; for example, a light source can include a filter wheel, wherein an adjustment of the filter wheel can be established based on the characteristic rotation sounds. Movements of other filters adjusted by a motor or actuator can also be identified by the sounds that occur during such an adjustment.

Additionally or alternatively, the computing device can also be configured to detect a component collision based on the microscope sounds, in particular between an objective and a sample, between an objective and a sample carrier or cover slip of the sample carrier; or between an objective and a sample stage. A collision between an objective and a sample stage can be identified, e.g., by characteristic scratching sounds. In collisions between an objective and a cover slip, there is initially a grating sound (crunch sound) followed by, if the pressure continues to increase, a breaking of the cover slip. The computing device can be configured to detect a collision between an objective and a cover slip early based on a grating as the microscope sound and to stop a component movement when such a collision is detected in order to prevent the cover slip from breaking.

In order to improve the interpretation of captured sounds, it is also possible to evaluate combinations of simultaneous or successive microscope sounds deriving from different microscope components or activities. For example, a collision is more likely if it is accompanied or preceded by a sample stage movement. If a microscope sound of a collision overlaps a microscope sound of a sample stage movement (e.g. characteristic sounds of a motor or friction) and/or if sounds of a sample stage movement precede the collision sound, then the computing device can infer a collision with a higher probability.

Ambient Sounds

The computing device can optionally be configured to take into account or identify both microscope sounds and ambient sounds from captured sounds. The variants described in the following are applicable to embodiments of the invention in which the computing device is only configured to be able to identify ambient sounds (but not microscope sounds) as well as embodiments in which the computing device is configured to identify both ambient sounds and microscope sounds.

In particular, ambient sounds can be sounds which are not produced on or by a component of the microscopy system and/or which are not produced by an operation of the microscopy system. Rather, ambient sounds can in particular be sounds the origin of which can be found in ambient influences or other objects which do not form part of the microscopy system. Sounds of a human origin which are not related to the operation or control of the microscopy system can also be considered ambient sounds. Voice commands of a person intended to control the microscope are thus optionally not considered ambient sounds. Ambient sounds can in particular be ambient sounds characteristic of a potentially disruptive external influence, e.g. resulting from vibrations of a floor, oscillations or changes in air pressure, or changes in an ambient temperature, brightness or humidity. Ambient sounds can thus relate to, e.g., one or more of the following: a draft (air movement), a closing or slamming of a room door or window, footsteps, a kicking or stumbling of a person, construction site noise, drilling sounds or a shock or blow to the microscope system or to an object not forming part of the microscope system, which could potentially cause a vibration of the microscope system. Ambient sounds can also be the sounds produced by a pneumatic adjustment of a table on which the microscope is supported. For the most part, these are characteristic hissing sounds. A pneumatic adjustment frequently takes the form of an automatic regulation by means of a sensor, which is intended to compensate any vibrations. The corresponding pneumatic sounds can thus indicate that a vibration has occurred. A further example of ambient sounds are air-conditioning sounds such as fan sounds, a humming or trickling sounds during operation, or a beep tone with which the air conditioner confirms receipt of a remote-control signal. Ambient sounds can also be caused by manual operating activity on ambient devices, for example by the activation of a light switch, a measurement device not forming part of the microscopy system or some other electronic device in the vicinity of the microscopy system. In particular, photography sounds of a camera can constitute ambient sounds. This camera is not part of the microscopy system, but can be, for example, a smartphone camera, wherein the sounds produced are, e.g., an imitation of a camera shutter sound output by the loudspeaker of the smartphone. Further ambient sounds can have their origin in equipment or devices used during the operation of the microscopy system. For example, the sounds of an opening or closing of an incubator panel or door can be captured. The computing device can thereby monitor whether a user has closed the incubator panel correctly before any measurements are performed. An opening or closing of other housing doors can also be captured in order to infer a state of a device or component. Fan sounds can also be identified as ambient sounds, wherein the computing device can optionally distinguish between different devices comprising a fan/ventilator based on different fan sounds.

The identification of an ambient sound can comprise a differentiation between different possible ambient sounds so as to specify a type of ambient sound or an ambient sound source. The computing device can thus identify in particular an ambient activity, an ambient state or an external influence.

The computing device can be configured to log an identified ambient sound. A time and/or a reference to captured microscope measurement data can be saved. For example, it can be recorded for captured image data whether an ambient sound was detected at the time of capture of the image. The ambient sound can be linked to the image data in the form of an audio file; alternatively, it is possible to save solely an indication of the type of ambient sound with the image data that was captured at the moment of the ambient sound. This information can also be saved as metadata of an image or video file. For example, it can be logged for a microscope image that a closing of a door was determined during the capture of this image. This facilitates troubleshooting in cases of deficient images. If it is recorded for captured microscope measurement data that a camera actuation sound was registered at the time of the measurement, a user can correctly match the time of capture of the measurement data with the time of capture of an image generated with means which do not form part of the microscopy system, for example a mobile phone, which produced the camera actuation sound. It is consequently possible for, e.g., a measurement configuration to be logged by means of the image from the mobile phone, this image being correctly matched with the microscope measurement data captured with the photographed measurement configuration.

The computing device can also be configured to present the user in the event of certain identified ambient sounds with an option of repeating a measurement performed concurrently with the ambient sound. Instead of the display of such an option, it is also possible for a repetition of the measurement to occur automatically. If, for example, the ambient sound takes the form of a loud blow likely to cause a disruptive vibration, an automatic repetition of the measurement can occur.

The computing device can also be configured to identify certain sounds as control signals of the microscope, for example as start and/or stop signals for a measurement procedure or image capture. In principle, any sounds can be exploited for this purpose; for example, the sounds can be produced by a person with an auxiliary device or by clapping. These sounds can optionally be considered ambient sounds or be identifiable by the computing device in addition to the ambient sounds described above.

Situation-Dependent Acoustic Monitoring

In principle, the described acoustic monitoring can be continuous. Alternatively, the computing device can also be configured to only carry out a detection of microscope sounds and/or ambient sounds or an operation of the microphone in response to a situation-dependent activation signal, i.e. a continuous monitoring does not occur. The computing device can generate the activation signal, e.g., for certain workflows of the microscope and/or in certain states deduced from a visual monitoring. For example, if an overview camera establishes a proximity between an objective and a sample or sample carrier, an activation signal can be generated in order to provide an additional acoustic collision monitoring.

Contextual Information

The computing device can optionally be configured to exploit additional contextual information in the detection of microscope sounds or the identification of a microscope activity in progress. The contextual information can stem, e.g., from an analysis of captured overview images or an analysis of measurement data of a (motion) sensor and/or be information regarding an initiated workflow of the microscope, a microscope configuration used, an employed sample carrier or a current microscope user. By identifying a microscope user, it is possible to analyze, e.g., sounds of the cleaning of a cover slip as a function of a user in order to take different habits into account. Knowledge of a microscope user can also provide clues as to a type of experiment conducted or which microscope components are frequently or never used by the user. For example, different models of automatic immersion units can differ in the sounds they produce; knowing which model the user owns can thus be advantageous in the interpretation of captured sounds.

The results of the described audio-based control/supervision can also be combined with results of other control methods using, e.g., an overview camera, a motion sensor or a contacting of electrical devices. The computing device can evaluate results of these control methods together in order to determine, e.g., a microscope activity in progress or a current microscope state with a particularly high degree of reliability. Alternatively or additionally, a result of one control method can be used as contextual information in one of the other control methods mentioned.

One or More Microphones and their Arrangement

Generally, one or more microphones can be provided. A microphone can be arranged directly on the microscope, e.g., on the stand, sample stage or objective revolver, or can be located at a distance from the microscope. A location of the at least one microphone can be fixed relative to the stand or microscope, which facilitates an interpretation of captured sounds. However, this is not mandatory and a variable position relative to the microscope is possible, e.g., if the microphone or one of the microphones is part of some other device, e.g., a smartphone, a screen or a monitoring camera independent of the microscope.

By using a plurality of microphones, the computing device is better able to filter out background noise or interfering sounds stemming in particular from other (microscope) systems located in the same room or hall. By evaluating captured sounds of the plurality of microphones, the computing device is also able to identify the microscope activity and/or an activity causing ambient sounds (ambient activity) depending on a location of a sound source. The sound source can be, e.g., a microscope component. This kind of location-dependent interpretation facilitates, for example, a determination of whether objective detachment/attachment sounds or scan mirror sounds in fact stem from the microscope to which the microphones belong or from another microscope in the same room. In cases where an incubator panel is the sound source, the plurality of microphones allow a more reliable distinction vis-à-vis sounds of other panels or panel activity involving a snap-in closure. An explicit localization of a sound source can take place, but is not mandatory. For example, a location-dependent identification of a microscope activity without an express localization of the sound source can be implemented in a machine-learned model by means of training data comprising sounds which were generated at different locations. Similar sounds of the training data can be annotated differently for different locations. A model is thereby learned which is able to discriminate and classify similar sounds deriving from different locations, without knowing or outputting the location of the sounds.

Active Sonar Method

The microscopy system can also comprise at least one sound transmitter in order to carry out an active sonar method. In principle, a sound transmitter can be any sound-producing component, for example a loudspeaker, a vibratable membrane or some other vibrationally excitable object. The computing device can be configured to control the sound transmitter or sound transmitters to emit acoustic pulses, wherein the at least one microphone measures reflected acoustic pulses. By evaluating the measured acoustic pulses, the computing device can establish a presence or a location of objects and/or identify an object, for example as a function of its dimensions and local coordinates determined by sonar.

Learned Model for Sound Evaluation

The computing device can be configured to evaluate captured sounds by means of at least one machine-learned model learned using training data of sounds or microscope sounds. The training data accordingly comprises sounds which at least partially contain microscope sounds and/or ambient sounds. Different types of sounds can overlap in the training data.

The model can be learned by means of a supervised learning process in which the training data comprises different microscope sounds and/or ambient sounds, which are respectively annotated with an indication of an associated microscope activity or ambient property. Annotations are thus labels by means of which training data is divided into different categories, e.g., collision, snap-in closure, scanning motion, stage motion or immersion activity. More than one label can be assigned to the same training example, e.g., stage motion with collision. Other sounds of the training data which are not microscope sounds are accordingly annotated differently, e.g., as ambient sounds or as sounds to be ignored.

Training data at least partially containing microscope sounds can comprise one or more of the following, in particular with a corresponding annotation:

cleaning sounds of a slide cleaning activity and optionally other cleaning sounds that do not belong to a slide cleaning activity;

sounds of an immersion device in the event of a correct application of an immersion medium;

sounds of an immersion device in the event of an incorrect application of an immersion medium;

insertion sounds of a sample carrier insertion activity on a sample stage and optionally other sounds produced with the sample carrier when placed on a substrate without an insertion activity being performed;

sounds of a shock or blow to the microscopy system and optionally sounds of a shock or blow which does not directly affect the microscopy system;

collision sounds of microscope components, in particular including a grating of a collision between an objective and a cover slip, breaking sounds of a cover slip in the event of a collision with an objective, sounds of a collision between an objective or a condenser and different types of sample carriers, sounds of a collision between an objective and a sample stage;

sounds of a DIC slider snapping into a DIC slot/chamber on the microscope; sounds of different filters snapping into corresponding filter slots/chambers on the microscope; other snap-in sounds unrelated to the microscope;

sounds of an objective being screwed into an objective revolver and optionally other sounds produced by a threaded attachment unrelated to the microscope;

movement sounds of a microscope component which is movable by a motor or actuator, in particular movement sounds of a manual or motorized sample stage in operation;

a rattling of an inadequately supported microscope component;

operating sounds of a microscope component in the event of a correct operation and in the event of an incorrect operation, wherein the microscope component is in particular a sample stage, an objective revolver, an objective, an immersion device, a laser scanner, a screw-on or otherwise releasably attachable component.

As the training data also includes sounds similar to the sounds to be detected but which do not derive from a microscope activity, it is possible to learn to distinguish between these sounds with a high degree of reliability, for example between a breaking of a cover slip and a breaking of some other object or glass.

The annotations labelling a microscope sound can also be linked to a commanding of an action or intervention or be replaced by such annotations. For example, the grating sound of a collision between an objective and a cover slip can be linked to the annotation "objective collision", which labels a microscope activity, or to an annotation designating an action, e.g., "stop sample stage movement/component movement".

Training data at least partially containing ambient sounds can include one or more of the following, in particular with a corresponding annotation: draft sounds; construction site noise; drilling sounds; air-conditioning sounds; sounds of a door closing or slamming next to the microscopy system; sounds of footsteps or of a person stumbling; hissing sounds of a pneumatic adjustment of a table on which the/a microscope is supported; manual operating activity on ambient devices; photography sounds of a camera.

Sounds of the training data can be captured with a microscope or microscopy system as described in the present disclosure. For this purpose, a plurality of microphones can be used simultaneously, as described in the foregoing. Optionally, a pre-processing of captured sounds can occur, wherein the training data and the sounds captured during operation which are to be evaluated are pre-processed in an identical manner.

Instead of a single learned model, it is also possible for a plurality of separate learned models to perform the tasks described here. For example, the aforementioned classification tasks can be distributed among different models.

The learned model or a further learned model can also be learned by means of an unsupervised learning process. In an unsupervised learning process, the training data can comprise, e.g., different microscope sounds and/or ambient sounds captured during an error-free operation of the microscope. A model which detects sounds of a predetermined class of normal or expected sounds is learned thereby. In the event of sounds that deviate from the training data, the model can identify a microscope activity in progress as an incorrect or potentially incorrect microscope activity. During a normal operation of the microscope without errors, sounds can be continuously captured and added to the training data in order to better identify expected normal sounds.

Sounds captured during normal operation can also be added to the training data in a supervised learning, wherein an annotation can occur automatically. This lends itself, for example, to predetermined workflows in which a user performs an activity and then confirms the successful completion of the activity, for example, by means of an input on the microscopy system or a computer. For example, a request can be issued in a workflow by the computing device to a user to position a calibration sample. The insertion sounds during the positioning of the calibration sample are captured and, by means of the subsequent confirmation of the performance of this activity by the user, the annotation can be generated that the captured sounds are sounds of an insertion/positioning of a calibration sample.

A learned model can comprise one or more neural networks, e.g., an RNN (recurrent neural network), an LSTM network (LSTM: long short-term memory) or an in particular one-dimensional or two-dimensional CNN (convolutional neural network). Captured audio signals can also be converted into two-dimensional representations such as, e.g., spectrograms or other images, which allows the use of model architectures known from image processing. Other deep neural network model architectures are also possible. A partially supervised training or a reinforcement learning is also possible.

In a supervised training, model parameters of the model are defined by means of a learning algorithm using the annotated training data. A predetermined objective function can be optimized to this end, e.g., a loss function can be minimized. The loss function describes deviations between the predetermined labels or annotations and current outputs of the model, which are calculated with the current model parameter values from entered training data. By means of this iterative minimization, the model is able to generate outputs that are closer and closer to the predetermined labels. The model parameter values are modified to minimize the loss function, which can be calculated, e.g., by gradient descent and backpropagation. In cases of a CNN, the model parameters can in particular comprise entries of convolution matrices of the different layers of the CNN.

Monitoring of Workflows and Actions

Results of the described audio control can be exploited for the monitoring of activity and/or the derivation of actions to be implemented/interventions in an activity in progress.

In particular, the computing device can be configured to monitor workflows, in which capacity it checks whether measured sounds are typical of a predetermined workflow. The computing device can also monitor manual steps of a workflow by checking whether sounds caused by a user on the microscope are typical of a current step of a predetermined workflow and optionally when the step is completed. If it is established based on the acoustic control that a microscope activity to be performed manually (e.g. following a request to the user to change, insert or attach something on the microscope) has been completed, the workflow can be continued automatically without a request for confirmation being issued to the user.

An action in the event of an identification of a certain microscope activity can also take the form of an outputting of warnings or requests for information to a user, a pausing of a workflow or an immediate stoppage of a current activity, e.g., a sample stage movement.

A verification of the audio-based identification of a microscope activity through some other monitoring modality can also be provided as an action. For example, in the event of an identification of a microscope activity based on the microscope sounds, it is possible to command an evaluation of an overview image in order to verify or refine the identification of the microscope activity. The overview image can already have been captured beforehand or be captured in response to the audio-based identification. For example, if captured sounds suggest the replacement of a sample carrier, a new overview image can be captured and evaluated with respect to the location and/or type of a present sample carrier.

If the computing device establishes a (in particular manual) movement or manipulation of a sample, sample carrier or sample stage of the microscope from the measured sounds, the computing device can accordingly optionally command a new calibration or a calibration control, e.g. by evaluating an overview image.

Moreover, the identification of an acoustically established microscope activity as well as related information can be recorded in a log file, e.g. for a subsequent error analysis, or transmitted to a microscope manufacturer, for example, in order to inform a technical service about an issue that has occurred.

General Features

The measurement signals processed by the computing device comprise the sounds captured by the microscope and can optionally further comprise any other measurement signals of the microscope, e.g., overview images or sample images.

A microphone can be of essentially any technical design and can capture infrasound or ultrasound in addition or alternatively to audible sound. Besides the narrower definition of a microphone as an airborne sound transducer designed to measure air pressure changes, a microphone can alternatively or additionally also be understood as an electroacoustic transducer that measures mechanical vibrations in solids. Such a transducer can be used to capture vibrations of a body coupled to the microphone, such as a stand, sample stage, objective revolver or some other microscope component on which the transducer is mounted. It is in particular possible to use a piezoelectric acoustic pickup.

Microscope sounds can be understood as the sounds caused by or on a microscope component. These include, e.g., sounds produced in the event of contact between the microscope component and another component or operating sounds of the microscope component. They can also be sounds caused by a user acting on the microscope component, e.g. when moving or cleaning a sample carrier or when changing microscope configurations. Voice commands with which a user can control an electronic device in an essentially known manner are accordingly not microscope sounds.

In the evaluation of captured sounds, it is possible to first identify a microscope sound and then deduce a microscope activity from the identified sound. Alternatively, there is no explicit labelling of the microscope sounds but rather a determination of a microscope activity directly from the captured sounds. This can be the case, e.g., with machine-learned models when an input into the model is the captured sound and an output of the model is an identified microscope activity. In particular with learned models, the identification of a microscope activity currently in progress and the instruction of an action can also be combined in a single output. For example, if a sound of a collision between an objective and a sample carrier is captured, a trained model can emit an output "stop collision through stoppage of current component movement" directly. In still further variants, an action, e.g. "stop current component movement", is commanded directly with the evaluation of captured sounds without an explicit identification or labelling of the captured microscope sounds or microscope activity associated with the same. For the purposes of illustration, different examples of the invention which involve an identification of a microscope activity in progress are described. The examples can, however, also be varied such that, instead of an identification of a microscope activity in progress, an action or an instruction for an intervention in the microscope activity occurs directly.

A microscopy system denotes an apparatus comprising at least one computing device and a microscope. A microscope can in particular be understood as a light microscope, an X-ray microscope, an electron microscope, an atomic force microscope or a macroscope. The operation of the microscope can in particular comprise a measurement operation, a calibration operation or preparatory measures for carrying out a subsequent measurement operation. Preparatory measures can comprise, e.g., a cleaning, positioning, setting or connecting of (microscope) components.

The computing device can be physically part of the microscope or arranged separately in the vicinity of the microscope or at a location at any distance from the microscope. The computing device can also be designed to be decentralized. It can generally be formed by any combination of electronics and software and can comprise in particular a computer, a server, a cloud-based computing system or one or more microprocessors or graphics processors. The computing device can also be configured to control a sample camera, an overview camera, an image capture, a sample stage movement and/or other microscope components.

An analyzed sample can of any kind including, for example, biological cells or cell parts, material samples or rock samples, electronic components and/or objects held in liquid.

A computer program according to the invention comprises commands that, when executed by a computer, cause the execution of one of the described method variants.

The characteristics of the invention that have been described as additional apparatus features also yield, when implemented as intended, variants of the method according to the invention. Conversely, a microscopy system can also be configured to carry out the described method variants. In particular, the computing device can be configured to carry out the described method variants and/or output commands for the execution of described method steps. The computing device can also comprise the described computer program. While some variants use a ready-trained model, other variants of the invention result from the execution of the corresponding training steps.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Different example embodiments are described in the following with reference to the figures.

FIG. 1

Figure 1:
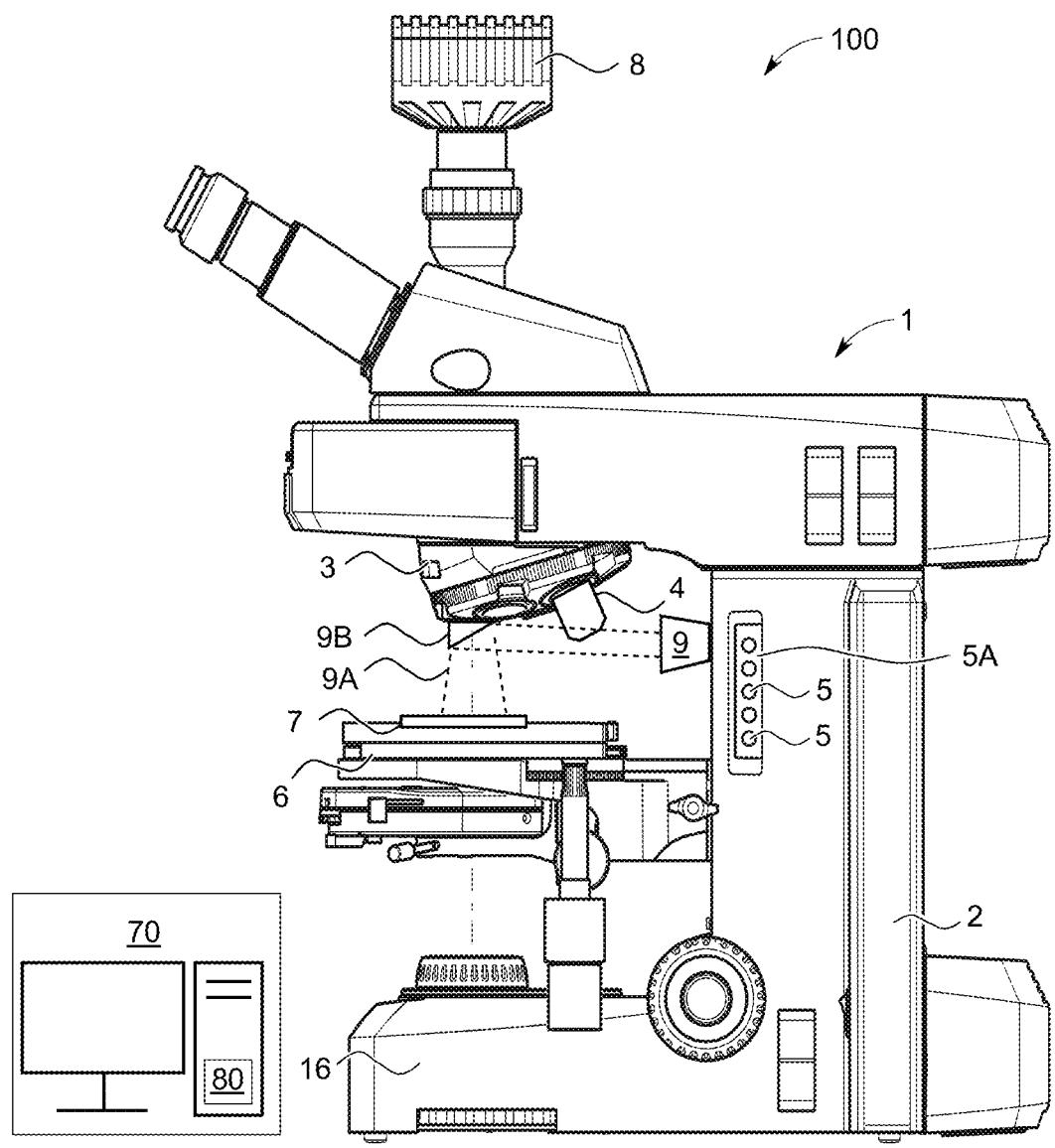
FIG. 1 shows schematically an example embodiment of a microscopy system of the invention.

FIG. 1 shows an example embodiment of a microscopy system 100 according to the invention. The microscopy system 100 comprises a computing device 70 and a microscope 1, which is a light microscope in the illustrated example, but which in principle can be any type of microscope. The microscope 1 comprises a stand 2 via which further microscope components are supported. The latter can in particular include: an illumination device 16; an objective changer/revolver 3, on which an objective 4 is mounted in the illustrated example; a sample stage 6 with a holding frame for holding a sample carrier 7 and a microscope camera 8. When the objective 4 is rotated into the light path of the microscope, the microscope camera 8 receives detection light from a sample area in which a sample can be located in order to capture a microscope image. Samples can be any object, fluid or structure. The microscope 1 also comprises an optional overview camera 9 for capturing an overview image of a sample environment. A field of view 9A of the overview camera 9 is larger than a field of view when a sample image is captured. In the illustrated example, the overview camera 9 views the sample carrier 7 via a mirror 9B. The mirror 9B is arranged on the objective revolver 3 and can be selected instead of the objective 4. In variations of this embodiment, the mirror can also be arranged at a different location, or the overview camera 9 is arranged so as to view the sample carrier 7 directly without a mirror 9B.

It is desirable to monitor microscope activities in progress in order to improve automatic processes, increase user friendliness, detect errors early and enable a correction of such errors where necessary. This can occur in part by means of the optional overview camera 9. In contrast to monitoring methods of the cited prior art, at least one microphone 5 is employed for monitoring. In the illustrated example, a microphone array 5A of a plurality of microphones 5 is used, which facilitates a direction-dependent and/or distance-dependent evaluation of captured sounds. In the illustrated case, the microphones 5 are arranged on the stand 2, although a positioning on other microscope components or at a distance from the microscope 1 is additionally or alternatively also possible.

Sounds captured by the at least one microphone 5 are evaluated by the computing device 70. The computing device 70 comprises a corresponding computer program 80 for this purpose. The computing device 70 or computer program 80 is configured to execute one of the examples of a method according to the invention described in the following.

FIG. 2

Figure 2:
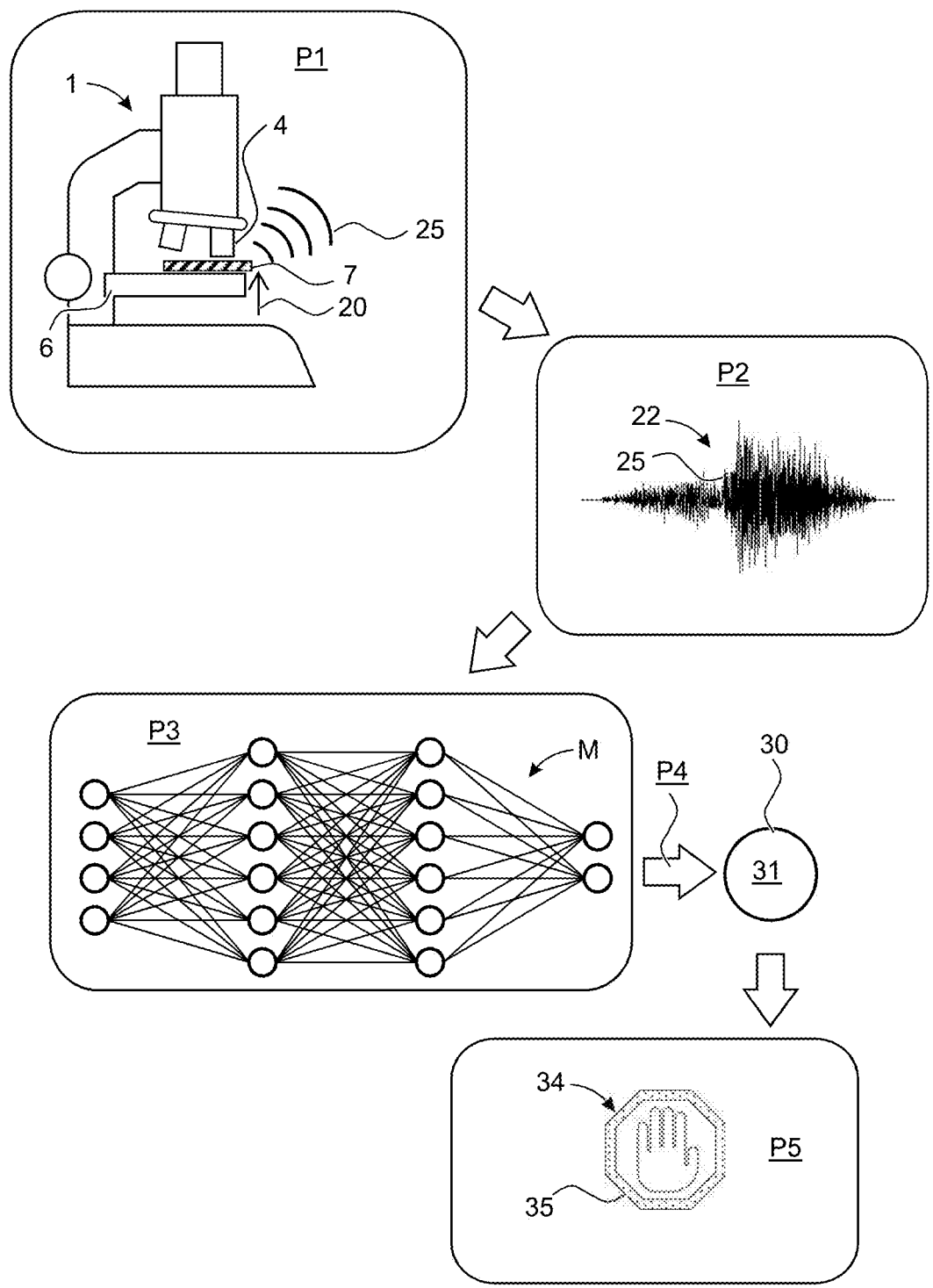
FIG. 2 illustrates schematically an example embodiment of a method of the invention.

FIG. 2 shows schematically a process sequence of an example embodiment of a method of the invention. A microscope sound 25 is produced by a microscope activity in progress/process P1. In the illustrated example, the microscope activity P1 is a collision between the objective 4 and the sample carrier 7 due to a height adjustment 20 of the sample stage 6. The collision causes sound waves, i.e. microscope sounds 25, characteristic of this microscope activity P1.

In process P2, the at least one microphone captures audio signals/sounds 22 containing the microscope sounds 25. In the sounds 22, the microscope sounds 25 can overlap with, e.g., ambient sounds or other microscope sounds, for example operating sounds of a sample stage motor.

In process P3, the captured sounds 22 are evaluated, optionally after a pre-processing. In the illustrated example, the sounds 22 are input into a machine-learned model M to this end. The model M is trained to classify input sounds 22. An output 30 generated in process P4 by the model M is thus an identification 31 or indication of a classification of a microscope activity in progress that caused the microscope sounds 25. In this example, the output 30 or identification 31 thus indicates a collision between an objective 4 and a sample carrier 7.

In process P5, an action (an intervention) 34 occurs based on the identified microscope activity, i.e. based on the output 30 of the model M. The intervention 34 can be a control of a microscope component. In the illustrated example, a stop command 35 is output in order to prevent a further movement of the sample stage 6. A breaking of the sample carrier 7 or cover slip of the sample carrier 7 can thereby potentially be avoided when microscope sounds 25 in the form of grating sounds of an initial contact are evaluated early.

The model M implemented here is described in more detail with reference to FIG. 3.

FIG. 3

Figure 3:
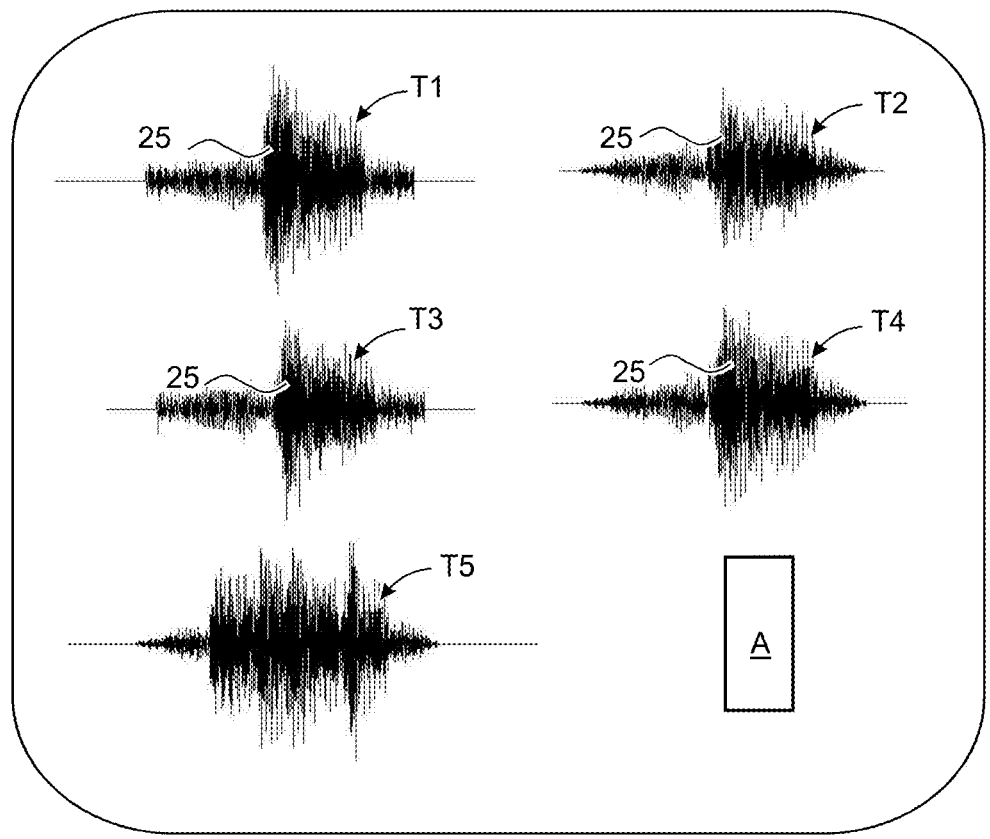
FIG. 3 illustrates schematically a training of a model of the method of FIG. 2.
Figure 3:
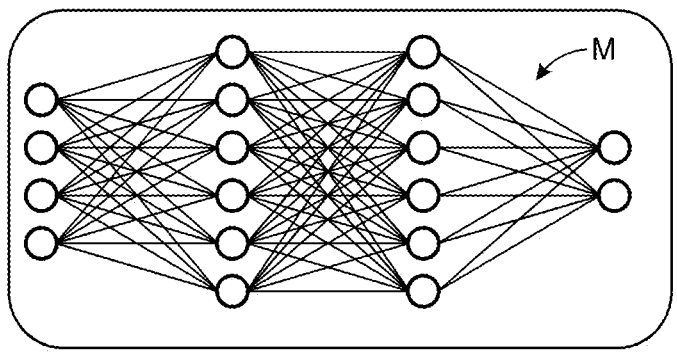

FIG. 3 shows schematically the model M of FIG. 2 together with training data T1-T5 by means of which model parameters of the model M are defined in a supervised learning process.

The model M can be, e.g., an RNN (recurrent neural network). Sounds captured, e.g., by the at least one microphone 5 are used as training data T1-T5. An annotation A is specified for each sound, the annotation A indicating whether or what kind of microscope sound 25 is contained in the respective training data. In the illustrated example, the training data T1-T4 respectively contain microscope sounds 25 deriving from a collision between an objective and a sample carrier, which is indicated accordingly in the annotations A. The training data T5, on the other hand, comprises other sounds produced, for example, by a sample carrier being pressed against other objects. This is likewise recorded by means of the annotations A. In the learning process, a predetermined learning algorithm iteratively adjusts parameters of the model M so that the outputs generated by the model M for the training data T1-T5 match the predetermined annotations A better and better. By means of the sounds and annotations A used here by way of example, the model M thus learns to distinguish between collision sounds which can occur between an objective and a sample carrier during operation of the microscope and other sounds which occur when other objects collide.

The described collision detection with subsequent stoppage of a component movement is merely a concrete example of a method according to the invention. The control device 70 can also be designed to be able to detect other or further microscope sounds 25. Microscope sounds 25 can be, for example, the sounds produced when a microscope component is moved, for example, a (manual) sample stage movement, a movement of a swivel arm or a turning of the objective revolver 3, or sounds produced by a microscope component in operation, for example operating sounds of a scanner or immersion device, or sounds produced on a microscope component by a user, for example when screwing an objective 4 into an objective changer 3 or when positioning a sample carrier 7 on the sample stage 6.

With reference to FIG. 2, the stop command 35 in process P4 is merely an example of an intervention 34 carried out based on the output 30 of the model M. Other interventions/actions 34 can relate to a control of basically any microscope component or to instructions to a user to carry out certain activities. In particular, a completion of individual steps to be performed by a user in a multi-step workflow can be monitored: for example, a user can be invited to set up a new sample carrier 7. If corresponding microscope sounds 25 (e.g. sounds of an insertion of a sample carrier 7 on a holding frame of the sample stage 6) are detected, it is possible to proceed automatically to the next step in the workflow without the user having to issue a command to proceed to the next step. A further example of a method according to the invention is described with reference to the following figure.

FIG. 4

Figure 4:
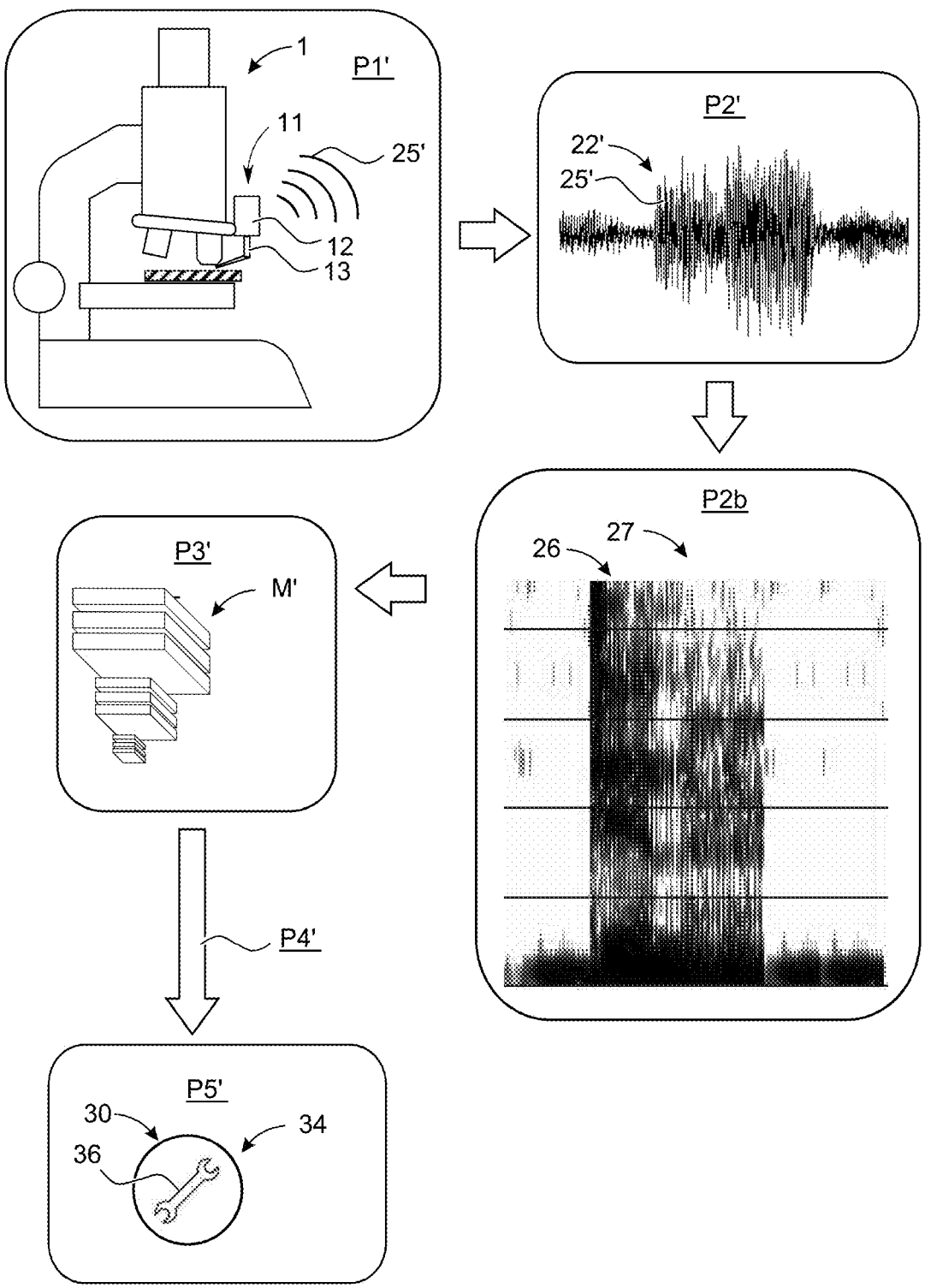
FIG. 4 illustrates schematically a further example embodiment of a method of the invention.

FIG. 4 schematically shows a process sequence of a further example embodiment of the method according to the invention. In this example, the microscope 1 is equipped with an immersion device 11 comprising, inter alia, an immersion medium tank 12, a pump (not illustrated) and an immersion medium line 13, for example a gooseneck, a tube and/or a rigid cannula. An immersion medium is conveyed from the immersion medium tank 12 to a front side of the objective through the immersion medium line 13. Characteristic microscope sounds 25 are produced by the operation of the pump and by the movement of the immersion medium through and out of the immersion medium line 13. In the event of a malfunction (microscope activity P1'), for example if the immersion medium line 13 is blocked or the pump draws air from the immersion medium tank 12, the resulting microscope sounds 25 are different.

The at least one microphone again captures sounds 22' containing the microscope sounds 25' of the immersion device 11 caused by the microscope activity P1' (process P2').

In this example, the captured sounds 22' are processed first before being evaluated by a learned model M'. The sounds 22' can be reproduced in a representation in which an amplitude is saved for successive points in time as, e.g., in standard pulse-code modulation (PCM) methods. This representation can be converted in process P2b into an audio spectrogram 26 representing a progression of different frequencies over time. The level of each frequency can be, e.g., colour-modulated or be represented by grey values or a line thickness. Such a spectrogram 26 or processed sounds 27 in general can be represented as a two-dimensional image. This image is input into a learned model M' designed, for example, as a CNN.

The learned model M' processes the input spectrogram 26 (process P3') and generates an output 30 (process P4') therefrom. The output 30 in this case is, however, not an identification of the microscope activity that caused the microscope sounds 25 (i.e. not an identification: "malfunction of the immersion medium device 11"). Instead, the model M' outputs an instruction for an action 34 intended for this microscope activity directly. In this example, a user is invited to check a fill level of the immersion medium tank 12 and/or to replace the immersion medium line 13 as the action/intervention 34 (reference sign 36).

Training data of the model M' can also be expediently represented in the form of spectrograms. The training data in this case can comprise spectrograms of microscope sounds produced during a correct operation of the immersion device 11. The training data can additionally contain spectrograms which correspond to microscope sounds captured during an incorrect operation of the immersion device 11. The training data can be annotated accordingly for a supervised learning process. Alternatively, in an unsupervised learning process, the training data can comprise solely spectrograms relating to a correct operation of the immersion device 11. The model can thereby be trained to detect anomalies, i.e. sounds that differ from the sounds produced in the event of a correct operation of the immersion device 11.

The described examples of the figures can also be combined. For example, the example of FIG. 2 can be varied such that the learned model M also processes spectrograms and/or such that the learned model M outputs the stop command 35 or, more generally, an instruction for an intervention 34 in the microscope activity directly instead of an identification 31 of a microscope activity currently in progress.

FIG. 5

Figure 5:
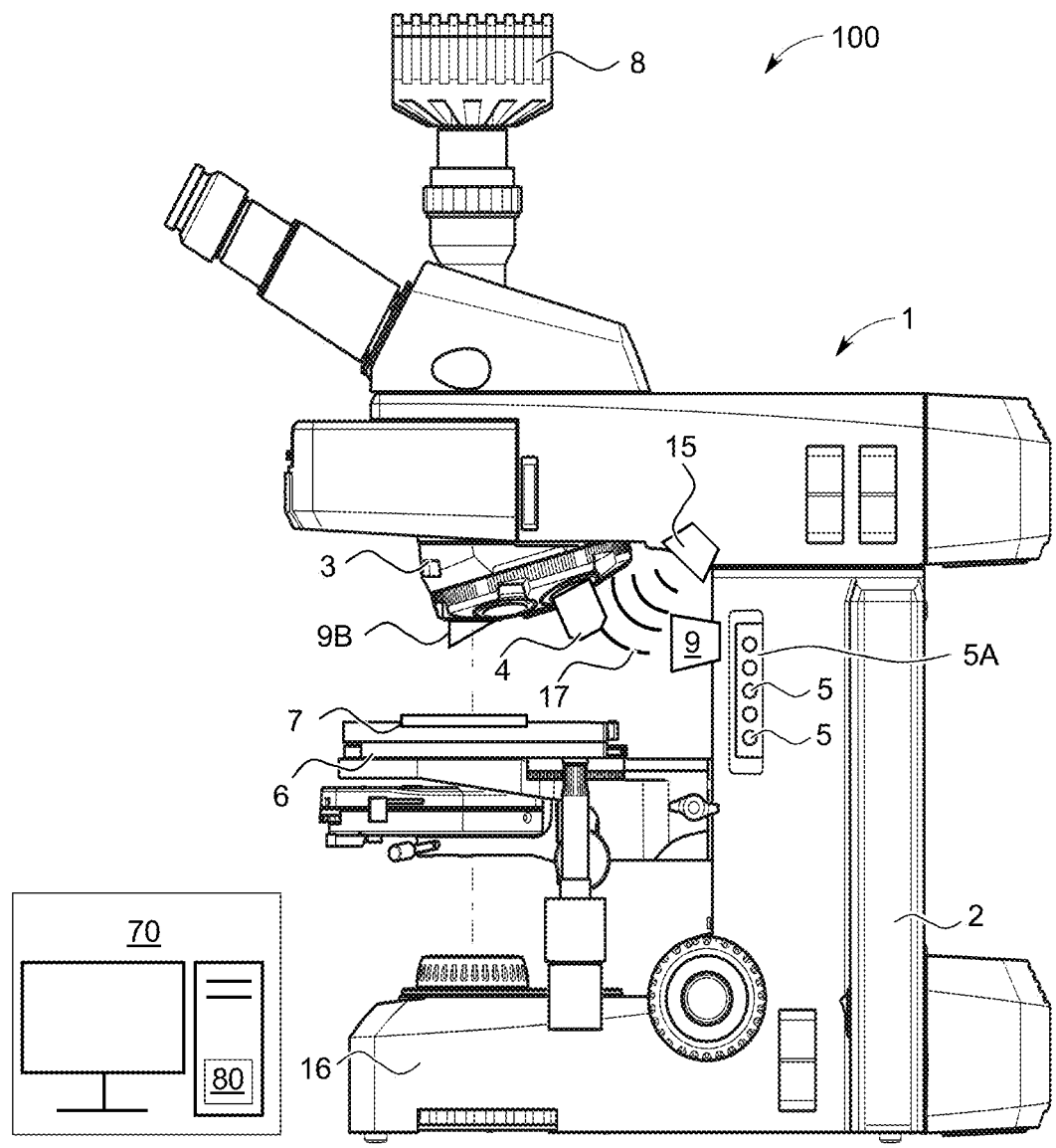
FIG. 5 shows schematically a further example embodiment of a microscopy system of the invention.

FIG. 5 shows schematically a further example embodiment of a microscopy system 100 according to the invention. Compared to the example shown in FIG. 1, the microscopy system 100 here additionally comprises a sound transmitter 15 in order to facilitate an active sonar method. In the illustrated example, the sound transmitter 15 is arranged on the stand 2. In principle, the sound transmitter 15 or further sound transmitters can also be provided at a different location or in a different orientation.

The computing device 70 controls the sound transmitter 15 to emit acoustic pulses 17. Any acoustic pulses 17 reflected by objects can then be measured by the at least one microphone 5. An evaluation of these measured acoustic signals by the computing device 70 allows an inference as to the location, size and/or shape of a sound-reflecting object. The object can be a microscope component or objects arranged in the sample area such as, e.g., a sample or the sample carrier 7.

Compared with the overview camera 9, the sonar method provides another, in principle larger monitoring area. In the illustrated arrangement, it can be determined, for example, by means of the acoustic pulses 17 whether objectives 4 and/or further microscope components, e.g. an immersion device, are arranged on the objective revolver 3. The field of view of the overview camera 9, on the other hand, is essentially limited to the mirror 9B and does not cover other components on the objective revolver 3. Depending on the precision of the implemented sonar method, it is possible to distinguish between different models of immersion devices and objectives.

FIG. 6

Figure 6:
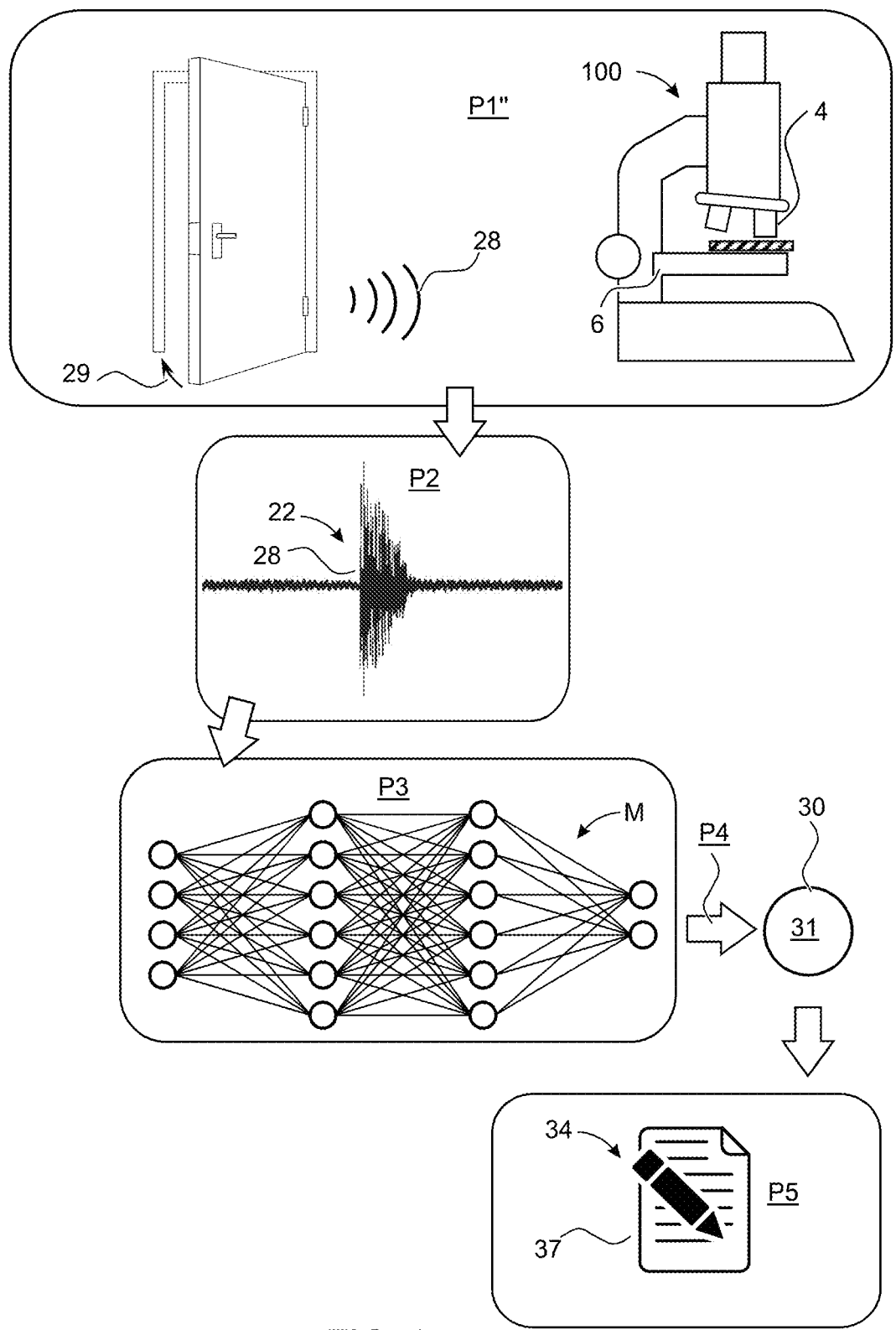
FIG. 6 illustrates schematically a further variant embodiment of a method according to the invention, which is carried out by an example embodiment of a microscopy system of the invention.

FIG. 6 shows schematically a process sequence of a further example embodiment of a method of the invention. In this case, the computing device of the microscopy system 100 is configured to identify ambient sounds from captured sounds.

An ambient activity 29, a closing of a door here, is shown by way of example as process P1". Ambient sounds 28 (a slamming of the closing door) occur as a result.

In process P2, the at least one microphone captures sounds 22 containing the ambient sounds 28.

In process P3, the captured sounds 22 are evaluated, e.g. by means of a machine-learned model M. The model M is trained to classify entered sounds 22. An output 30 generated in process P4 by the model M is thus an identification 31 or an indication of a classification of the ambient activity that caused the ambient sounds 28. In this example, the output 30 or identification 31 thus indicates a closing of a room door.

In process P5, an action 34 occurs based on the identified ambient activity, i.e. based on the output 30 of the model M. In the present example, the action 34 is a logging 37 of the identified ambient activity 29. In particular, it is logged which measurement data were captured concurrently with the ambient activity 29 and may have been influenced by the ambient activity 29. This makes it easier for a user to check for potentially compromised measurements during a measurement series. In the event of an identification of potentially compromised measurements, the ambient activity 29 can be identified as a source of interference easier and more reliably.

The computing device can also be designed to identify other ambient sounds such as those listed in the foregoing description. The example embodiment of FIG. 6 can also be combined with the example embodiment of FIG. 2 or FIG. 4. Captured sounds 22 can thereby be evaluated for both any microscope sounds 25, 25' and any ambient sounds 28 they contain.

The model M of FIG. 6 can be designed as described with reference to FIG. 3 wherein, however, the training data further comprises sounds containing examples of ambient sounds that the model M is intended to be able to identify. The training data can accordingly include ambient sounds of, e.g., a slamming door, an opening of an incubation panel, a pneumatic adjustment of a table supporting the microscope or construction noise, with a corresponding annotation. The microscopy system 100 used in the embodiment of FIG. 6 can comprise the features described in relation to the microscopy systems of FIG. 1 and/or FIG. 5.

The described example embodiments are purely illustrative and variants of the same are possible within the scope of the attached claims.

LIST OF REFERENCE SIGNS

1 Microscope
2 Stand
3 Objective revolver
4 (Microscope) objective
5 Microphone
5A Microphone array
6 Sample stage
7 Sample carrier
8 Microscope camera
9 Overview camera
9A Field of view of the overview camera
9B Mirror
11 Immersion device
12 Immersion fluid tank
13 Immersion fluid line
15 Sound transmitter
16 Illumination device
17 Acoustic pulses of the sound transmitter 15
20 Height adjustment of the sample stage 6 causing a collision
22, 22' Sounds
25, 25' Microscope sounds
26 Spectrogram
27 Processed sounds
28 Ambient sound
29 Ambient activity, in particular closing of a door
30 Output of the learned model M
30 Identification or indication of a classification of a microscope activity in progress
34 Action/intervention in a microscope activity
35 Stop command
36 Instruction: Check immersion medium tank/immersion medium line
37 Logging of the ambient activity
70 Computing device
80 Computer program
100 Microscopy system
A Annotations of the training data T1-T5
M, M' Learned model for evaluating captured sounds
P1 Microscope activity/process: component collision
P1' Microscope activity/process: incorrect operation of immersion device 11
P1", P2-P4, P2b, P2, P4) Processes of methods according to the invention
T1-T5 Training data for learning the model M

What is claimed is:

1. A microscopy system comprising:
a microscope for analyzing a sample;
a computing device for processing measurement signals; and
at least one microphone for capturing sounds;
wherein the computing device is configured to evaluate captured sounds in order to identify a microscope activity in progress or command an intervention in the microscope activity in progress based on microscope sounds.

2. The microscopy system according to claim 1,
wherein the computing device is configured to infer a defect of a microscope component based on the microscope sounds;
wherein the microscope component is a sample stage, an objective revolver, a laser scanner, an immersion device, a screw-on or otherwise releasably attachable component.

3. The microscopy system according to claim 1,
wherein the computing device is configured to infer an operating state of the microscope based on the microscope sounds;
wherein the computing device is configured to detect one or more of the following as an operating state:
a differential interference contrast mode, based on a sound of a differential interference contrast (DIC) slider clicking into place as the microscope sound;
a mounting of an objective, based on a sound of an objective being screwed into an objective revolver as the microscope sound;
a sample stage movement, based on a sound of an operation of a manual sample stage as the microscope sound;
a defective support of a microscope component, based on microscope sounds characteristic of a loose support of the microscope component;
an incorrect condenser position, based on movement sounds of a swivel arm of a condenser when no sound of a complete pivoting of the swivel arm into place is detected.

4. The microscopy system according to claim 1,
wherein the computing device is configured to detect one or more of the following as microscope sounds and corresponding identified microscope activities:
collision sounds of a collision between microscope components;
cleaning sounds of a slide cleaning activity;
sounds of an application of an immersion medium, wherein it is distinguished based on these sounds between a correct immersion activity and an incorrect immersion activity in which air bubbles get into the immersion medium;
insertion sounds of a sample carrier insertion activity at a sample stage;
movement sounds of a filter wheel with filters being rotated in or out of a microscope light path.

5. The microscopy system according to claim 1,
wherein the computing device is configured to detect a grating of a collision between an objective and a cover slip as microscope sounds and, in the event of the detection of such a collision, to stop a component movement in order to prevent a breaking of the cover slip.

6. The microscopy system according to claim 1,
wherein the computing device is configured to also use contextual information for the identification of a microscope activity in progress, wherein the contextual information stems from an analysis of captured overview images or measurement data of a motion sensor or is information regarding an initiated workflow of the microscope, a microscope configuration used, an employed sample carrier or a current microscope user.

7. The microscopy system according to claim 1,
wherein the computing device is configured to monitor manual steps of a workflow by checking whether microscope sounds caused by a user on the microscope are typical of a current step of a predetermined workflow and when the step is completed.

8. The microscopy system according to claim 1,
the microscopy system further comprising an overview camera,
wherein the computing device is configured to capture an overview image with the overview camera in the event of an identification of a microscope activity based on the microscope sounds and to evaluate the overview image in order to verify or refine the identification of the microscope activity.

9. The microscopy system according to claim 1,
wherein the computing device is configured to establish a movement or manipulation of a sample, sample carrier or sample stage of the microscope from the captured sounds and accordingly command a new calibration or calibration control.

10. The microscopy system according to claim 1,
wherein the computing device is configured to also identify ambient sounds in addition to microscope sounds from captured sounds.

11. The microscopy system according to claim 10,
wherein the computing device is configured to log which measurements occurred concurrently with a detected ambient sound or microscope sound.

12. The microscopy system according to claim 10,
wherein the computing device is configured to carry out an identification of microscope sounds or ambient sounds in response to a situation-dependent activation signal and not continuously,
wherein the computing device is configured to generate the activation signal in the event of certain workflows of the microscope or in the event of certain states deduced from a visual monitoring.

13. The microscopy system according to claim 10,
comprising a plurality of microphones and
wherein the computing device is configured to carry out an identification of the microscope activity or of an ambient activity causing an ambient sound by evaluating captured sounds of the plurality of microphones depending on a location of a sound source.

14. The microscopy system according to claim 1,
wherein the computing device is configured to evaluate captured sounds using a machine-learned model learned using training data of at least one of microscope sounds or ambient sounds.

15. The microscopy system according to claim 14,
wherein the model is learned using a supervised learning process in which the training data comprise at least one of different microscope sounds or different ambient sounds, which are respectively annotated with an annotation of an associated microscope activity,
wherein the training data comprise one or more of the following:
cleaning sounds of a slide cleaning activity; other cleaning sounds that do not belong to a slide cleaning activity;
sounds of an immersion device in the event of a correct application of an immersion medium;
sounds of an immersion device in the event of an incorrect application of an immersion medium;
insertion sounds of a sample carrier insertion activity at a sample stage;
other sounds produced with the sample carrier when placed on a substrate without an insertion activity being performed;
sounds of a shock or blow to the microscopy system;
other sounds of a shock or blow which does not directly affect the microscopy system;
collision sounds of microscope components, including a grating of a collision between an objective and a cover slip, breaking sounds of a cover slip in the event of a collision with an objective, sounds of a collision between an objective or a condenser and different types of sample carriers, sounds of a collision between an objective and a sample stage;
sounds of a differential interference contrast (DIC) slider snapping into a DIC slot on the microscope;
sounds of different filters snapping into corresponding filter slots on the microscope;
other snap-in sounds unrelated to the microscope;
sounds of an objective being screwed into an objective revolver;
other sounds produced by a threaded attachment unrelated to the microscope;
movement sounds of a manual or motorized sample stage in operation;
movement sounds of a microscope component which is movable by a motor or actuator;
a rattling of an incorrectly attached microscope component;
operating sounds of a microscope component in the event of a correct operation and in the event of an incorrect operation, wherein the microscope component is a sample stage, an objective revolver, an objective, an immersion device, a laser scanner or a screw-on or otherwise releasably attachable component;
draft sounds, construction site noise, drilling sounds or air-conditioning sounds;
sounds of a door closing or slamming next to the microscopy system;
sounds of footsteps or a person stumbling;
hissing sounds of a pneumatic adjustment of a table on which the microscope is supported;
manual operating activity on ambient devices;
photography sounds of a camera.

16. The microscopy system according to claim 14,
wherein the model is learned using an unsupervised learning process in which the training data comprise at least one of different microscope sounds and different ambient sounds captured during an error-free operation of the microscope.

17. The microscopy system according to claim 1,
further comprising a sound transmitter,
wherein the computing device is configured to control the sound transmitter to emit acoustic pulses, wherein the microphone measures reflected acoustic pulses, and
wherein the computing device is configured to establish a presence or location of objects by evaluating the acoustic pulses measured by the microphone.

18. The microscopy system according to claim 1, wherein the computing device is configured to monitor workflows by checking whether captured sounds are typical of a predetermined workflow.

19. A method for monitoring microscope activity, comprising:
- operating a microscope;
- capturing sounds using at least one microphone; and
- a computer evaluating the captured sounds in order to identify a microscope activity in progress or command an intervention in the microscope activity in progress based on microscope sounds.

20. A computer program with commands which are stored on a non-transitory computer-readable medium and which, when executed by the computer, cause the execution of the method of claim 19.

21. A microscopy system comprising:
- a microscope for analyzing a sample;
- a computer for processing measurement signals; and
- at least one microphone for capturing sounds;
- wherein the computer is configured to evaluate captured sounds to identify microscope sounds generated by or on a component of the microscope from the captured sounds in order to identify a microscope activity in progress or command an intervention in the microscope activity in progress based on the microscope sounds.

22. The microscopy system of claim 21, wherein the computer is further configured to evaluate captured sounds in order to identify ambient sounds which are not produced on or by a component of the microscopy system in order to identify a potentially disruptive external influence to the microscope activity.

* * * * *